(12) United States Patent
Iwata (10) Patent No.: US 11,565,333 B2
(45) Date of Patent: Jan. 31, 2023

(54) POWER TOOL

(71) Applicant: KOKI HOLDINGS CO., LTD., Tokyo (JP)

(72) Inventor: Satoshi Iwata, Hitachinaka (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 229 days.

(21) Appl. No.: 16/760,423

(22) PCT Filed: Sep. 28, 2018

(86) PCT No.: PCT/JP2018/036306
§ 371 (c)(1),
(2) Date: Apr. 29, 2020

(87) PCT Pub. No.: WO2019/087636
PCT Pub. Date: May 9, 2019

(65) Prior Publication Data
US 2021/0370543 A1    Dec. 2, 2021

(30) Foreign Application Priority Data
Oct. 31, 2017    (JP) .............................. JP2017-211306

(51) Int. Cl.
B23D 47/12    (2006.01)
(52) U.S. Cl.
CPC .................... B23D 47/12 (2013.01)
(58) Field of Classification Search
CPC ........... B27B 5/38; F16D 7/025; B23D 47/12; B23D 47/123; B23D 47/126
(Continued)

(56) References Cited

U.S. PATENT DOCUMENTS 681,476 A * 8/1901 Flautt ...................... F16D 7/025
464/23
1,261,763 A * 4/1918 Cameron ................ F16D 7/025
192/55.1
(Continued)

FOREIGN PATENT DOCUMENTS

| CN | 158775 A | 9/1997 |
| CN | 101209504 A | 7/2008 |

(Continued)

OTHER PUBLICATIONS

Office Action dated Mar. 30, 2021 in corresponding Japanese Patent Application No. 201880071064.7 (English Translation Provided).
(Continued)

*Primary Examiner* — Ghassem Alie
*Assistant Examiner* — Samuel A Davies
(74) *Attorney, Agent, or Firm* — NovoTechIP International PLLC (57) ABSTRACT

A power tool includes a motor including a rotation shaft; an output shaft to which a cutting blade is attachable; a belt for transmitting a rotational force of the rotation shaft to the output shaft; an intermediate shaft positioned between the rotation shaft and the output shaft on a transmission path of the rotational force; a plurality of pulleys including a first pulley provided on the rotation shaft and rotatable integrally with the rotation shaft and a second pulley through which the intermediate shaft is inserted and having a diameter greater than that of the first pulley, the first pulley and the second pulley supporting the belt and being rotatable in accordance with rotation of the rotation shaft; and a transmission restricting part provided on a transmission path for transmitting rotation of the second pulley to the cutting blade and configured to interrupt or limit transmission of a rotational force.

8 Claims, 7 Drawing Sheets

(58) Field of Classification Search
USPC .......................................................... 83/543
See application file for complete search history.

(56) References Cited

U.S. PATENT DOCUMENTS

| | | | | |
|---|---|---|---|---|
| 1,672,238 A * | 6/1928 | Wallace | ................. | B27G 19/04 83/564 |
| 1,900,553 A * | 3/1933 | Hampton | ............. | B23D 47/126 83/397 |
| 1,931,075 A * | 10/1933 | Johnson | ................. | B63H 20/14 464/44 |
| 1,949,340 A * | 2/1934 | Togel | ....................... | A24C 5/28 83/591 |
| 2,000,581 A * | 5/1935 | Coffin, Jr. | ................. | F16N 7/12 277/423 |
| 2,353,763 A * | 7/1944 | Rodman | ................. | F16C 27/08 369/269 |
| 2,809,718 A * | 10/1957 | Kos | ......................... | F16H 57/05 83/788 |
| 3,021,742 A * | 2/1962 | Jackson | ............. | B30B 15/0029 83/699.41 |
| 3,092,983 A * | 6/1963 | Huber | ..................... | F16D 7/025 464/46 |
| 3,201,953 A * | 8/1965 | Firth | ....................... | F16D 7/025 464/46 |
| 4,422,589 A * | 12/1983 | Okada | .................... | G11B 15/50 242/534 |
| 4,664,645 A * | 5/1987 | Muck | ...................... | B23D 47/12 474/84 |
| 4,709,871 A * | 12/1987 | Tanaka | ................... | G11B 15/32 242/356.5 |
| 5,704,257 A * | 1/1998 | Kottke | ............... | A01D 34/6806 74/813 L |
| 5,844,340 A * | 12/1998 | Noda | .................... | F15B 15/086 92/88 |
| 5,996,756 A * | 12/1999 | Schmodde | ............ | D04B 15/94 192/69.7 |
| 6,016,732 A | 1/2000 | Brault et al. | | |
| 6,233,831 B1 * | 5/2001 | Iida | ..................... | B23D 59/006 30/124 |
| 6,295,910 B1 * | 10/2001 | Childs | .................... | F16D 7/025 83/543 |
| 6,318,353 B1 | 11/2001 | Edwards et al. | | |
| 6,776,718 B2 * | 8/2004 | Tu | ........................... | B66C 15/00 464/46 |
| 6,848,998 B2 * | 2/2005 | Bosk | ....................... | F16D 7/028 464/43 |
| 2003/0224911 A1 * | 12/2003 | Warner | ................... | F16D 41/24 482/57 |
| 2004/0069513 A1 * | 4/2004 | Wolf | ....................... | B25F 5/001 173/216 |
| 2004/0261273 A1 * | 12/2004 | Griep | .................... | B23D 51/16 30/392 |
| 2005/0113175 A1 * | 5/2005 | Peters | ..................... | F16D 7/044 464/39 |
| 2007/0151433 A1 | 7/2007 | Gass et al. | | |
| 2008/0011140 A1 | 1/2008 | Choi | | |
| 2009/0151529 A1 * | 6/2009 | Miura | .................. | B23D 45/048 83/471.3 |
| 2009/0260498 A1 * | 10/2009 | Imamura | .............. | B23D 45/048 83/663 |
| 2010/0155166 A1 * | 6/2010 | Pesenti | ................. | F16D 43/215 180/205.4 |
| 2010/0243398 A1 * | 9/2010 | Nagami | .................. | F16D 7/025 192/56.6 |
| 2011/0232443 A1 * | 9/2011 | Kojima | .................. | B23D 47/12 83/74 |
| 2012/0157257 A1 * | 6/2012 | Hirabayashi | ............ | B27B 17/08 192/93 R |
| 2013/0055873 A1 * | 3/2013 | Cox | ....................... | B23D 47/12 83/471.2 |
| 2016/0303667 A1 * | 10/2016 | Marinov | ................ | B23D 47/12 |

FOREIGN PATENT DOCUMENTS

| | | | | | |
|---|---|---|---|---|---|
| JP | 51136060 A | * | 11/1976 | ............ | F16D 7/025 |
| JP | 57018815 A | * | 1/1982 | ............ | F16C 35/06 |
| JP | 62080311 A | * | 4/1987 | ............ | F16D 7/025 |
| JP | 2008018523 A | | 1/2008 | | |
| JP | 2010-274391 | * | 12/2010 | | |
| JP | 2010274391 A | | 12/2010 | | |
| JP | 5476798 B2 | | 4/2014 | | |
| WO | 2017154522 A1 | | 9/2017 | | |

OTHER PUBLICATIONS

International Preliminary Report on Patentability dated May 5, 2020 in International Application No. PCT/JP2018/036306 (English Translation).

Supplementary European Search Report dated Jul. 19, 2021 in corresponding European patent application No. 18872399.3.

International Search Report and Written Opinion dated Dec. 25, 2018 by the International Searching Authority (Japan Patent Office) in PCT Application PCT/JP2018/036306 (English Translation of the ISR).

Microfilm of the specification and drawings annexed to the request of Japanese Utility Model Application No. 157547/1983 (Laid-open No. 64801/1985) (Makita Electric Works, Ltd.) May 8, 1985.

\* cited by examiner

POWER TOOL

TECHNICAL FIELD

The present invention relates to a power tool.

BACKGROUND ART

Conventionally, tabletop cutting machines have been widely used as power tools for cutting workpieces such as wood, pipes, and the like.

In the tabletop cutting machine described in Patent Document 1, for example, rotation of a motor shaft is transmitted to an intermediate rotation shaft through a first-stage transmission mechanism including a first pulley mounted on the motor shaft, a second pulley mounted on the intermediate rotation shaft, and a first belt looped over the first pulley and the second pulley. Further, rotation of the intermediate rotation shaft is transmitted to a saw blade shaft in order to rotate a saw blade mounted on the saw blade shaft through a second-stage transmission mechanism including a third pulley mounted on the intermediate rotation shaft, a fourth pulley mounted on the saw blade shaft, and a second belt looped over the third pulley and the fourth pulley. Since rotation of the motor can be reduced and transmitted to the saw blade without employing gears, this configuration has the advantage of not generating noise caused by the meshing engagement of gears.

PATENT LITERATURE

Japanese Patent No. 5476798

SUMMARY OF INVENTION

Technical Problem

However, if the saw blade shaft locks up in the tabletop cutting machine described in Patent Document 1 as the saw blade cuts into the workpiece so that the shaft is incapable of rotating, parts of the transmission mechanisms, such as the belts, may be damaged by rotation of the motor as the motor attempts to continue rotating.

In view of the foregoing, it is an object of the present invention to provide a power tool that can suppress damage to a power transmission mechanism.

Solution to Problem

In order to attain the above and other objects, the present invention provides a power tool including: a motor including a rotation shaft that is driven to rotate; an output shaft to which a cutting blade is attachable; a belt capable of transmitting a rotational force of the rotation shaft to the output shaft; an intermediate shaft positioned between the rotation shaft and the output shaft on a transmission path of the rotational force; a plurality of pulleys including a first pulley provided on the rotation shaft and rotatable integrally with the rotation shaft and a second pulley through which the intermediate shaft is inserted and having a diameter greater than a diameter of the first pulley, each of the first pulley and the second pulley supporting the belt and being rotatable in accordance with rotation of the rotation shaft; and a transmission restricting part provided on a transmission path for transmitting rotation of the second pulley to the cutting blade and configured to interrupt or limit transmission of a rotational force.

According to the power tool with the above structure, since the power tool includes a transmission restricting part provided on the transmission path for transmitting the rotation of the second pulley to the cutting blade and configured to interrupt or limit the transmission of the rotational force, the power tool can interrupt the transmission of the rotational force of the rotation shaft of the motor to the intermediate shaft before the output shaft locks up caused by the cutting blade cutting into a workpiece, and can reduce damage to components constituting the transmission mechanism such as the belts and the pulleys due to the rotational force of the motor that attempts to continues rotating. Further, the transmission restricting part is configured to act on rotational bodies on which torque greater than torque acting on the motor shaft acts. This configuration can adequately suppress the transmission restricting part from excessively or insufficiently interrupting or limiting the transmission of the rotation.

In the above structure, preferably, the transmission restricting part is configured to transmit the rotation of the second pulley to the intermediate shaft through a frictional force. Further, it is also preferable that the transmission restricting part is configured to interrupt the transmission of the rotation of the second pulley to the intermediate shaft when a load applied to the intermediate shaft exceeds a prescribed load.

With this structure, when a load applied to the intermediate shaft exceeds a prescribed value, the transmission of the rotation of the second pulley to the intermediate shaft through the frictional force can be interrupted. Accordingly, the power tool can interrupt the transmission of the rotational force of the rotation shaft of the motor to the intermediate shaft before the output shaft locks up caused by the cutting blade cutting into a workpiece, and can reduce damage to components constituting the transmission mechanism such as the belts and the pulleys due to the rotational force of the motor that attempts to continues rotating. Further, owing to the frictional force between the second pulley having a diameter greater than the first pulley and having a side surface area greater than the first pulley and the intermediate shaft, the rotation can be appropriately transmitted. Still further, the power tool is configured to transmit or interrupt of the rotation through the frictional force using the second pulley through which the intermediate shaft on which torque greater than torque acting on the motor shaft acts is inserted. This configuration enables the transmission of the rotation to be interrupted adequately within a range of prescribed load torque acting on the intermediate shaft even if a load to generate the frictional force varies.

Preferably, the transmission restricting part includes a pressing part provided on the intermediate shaft and defining a pressing surface orthogonal to a direction intersecting a radial direction of the intermediate shaft and a pressed part provided on the second pulley and capable of abutting the pressing surface, and the transmission restricting part is configured to transmit the rotation of the second pulley to the intermediate shaft through a frictional force caused by a surface pressure between the pressing part and the pressed part.

With this structure, the rotation can be adequately transmitted through the frictional force between the pressed part provided on the second pulley having a greater diameter than the first pulley and the pressing part provided on the intermediate shaft.

Preferably, the transmission restricting part further includes an urging member configured to urge one of the pressing part and the second pulley toward remaining one of the pressing part and the second pulley.

With this structure, the frictional force can be generated between the pressing part and the second pulley with a simple structure.

Preferably, the intermediate shaft is supported by two bearings, and the pressing part and the second pulley are disposed between the two bearings in an axial direction of the intermediate shaft.

With this structure, the frictional force can be appropriately generated between the pressing part and the second pulley.

Preferably, the intermediate shaft is formed with a groove having an opening facing an inner circumferential surface of the second pulley through which the intermediate shaft is inserted, and the groove is filled with oil.

With this structure, the intermediate shaft and the second pulley can adequately rotate relative to each other since the oil spreads between the intermediate shaft and the inner circumferential surface of the second pulley. Accordingly, the power tool can adequately suppress damage to the belt.

Preferably, the power tool further includes a restricting part capable of restricting rotation of the output shaft.

With this structure, an end bit tool can be suitably attached and detached while the output shaft remains fixed.

Preferably, the plurality of pulleys further includes a third pulley rotatable integrally with the output shaft, the third pulley is formed with a hole extending in an axial direction of the output shaft, the restricting part comprises a restricting member extending in the axial direction of the output shaft, and the restricting part is capable of restricting the rotation of the output shaft when the restricting member is inserted into the hole.

With this structure, an end bit tool can be suitably attached and detached while the output shaft remains fixed.

Preferably, the plurality of pulleys further includes a fourth pulley having a diameter smaller than a diameter of the third pulley and rotatable integrally with intermediate shaft, and the belt includes a first belt looped over the first pulley and the second pulley and configured to transmit the rotation of the rotation shaft to the intermediate shaft and a second belt looped over the third pulley and the fourth pulley and configured to transmit rotation of the intermediate shaft to the output shaft.

With this structure, the rotational force of the rotation shaft of the motor can be transmitted to the output shaft after being reduced in two stages through the two-stage transmission mechanism.

Preferably, the first belt is a V-belt, and the first pulley and the second pulley are V-pulleys.

With this structure, even if an unexpected high load is generated in the cutting blade, the V-belt slides over an outer circumference of the V-pulleys, thereby suppressing damage to components for transmitting the rotation. Accordingly, durability of the tool can be improved.

Preferably, the second belt is a timing belt, and the third pulley and the fourth pulley are timing pulleys.

With this structure, even if a high load is generated in the cutting blade, wobble in the power tool can be suppressed so that the intermediate shaft can be supported with high accuracy, whereby stable cutting operation can be performed with efficiency. Further, by using the timing belt and the timing pulleys, the transmission efficiency of the rotation can be improved and damage to the belts can be suppressed, thereby enabling improvement of the durability of the tool.

Preferably, the urging member is a disc spring.

Preferably, a plurality of the disc springs is provided.

Preferably, the urging member is accommodated in a recessed part provided in the second pulley.

Advantageous Effects of Invention

According to the power tool of the present invention, damage to a power transmission mechanism can be suppressed.

DESCRIPTION OF EMBODIMENTS

A miter saw 1 as an example of a power tool according to an embodiment of the present invention will be described with reference to FIGS. 1 through 7. The miter saw 1 is an electric power tool for cutting workpieces such as wood, aluminum sash and the like. As illustrated in FIGS. 1 through 4, the miter saw 1 is configured to include a base part 2, a holder 3, a guide part 4, a movable part 5, and a cutting unit 6 on which a cutting blade P is attachable. The cutting blade P is an example of the "cutting blade" in the present invention.

Figure 1:
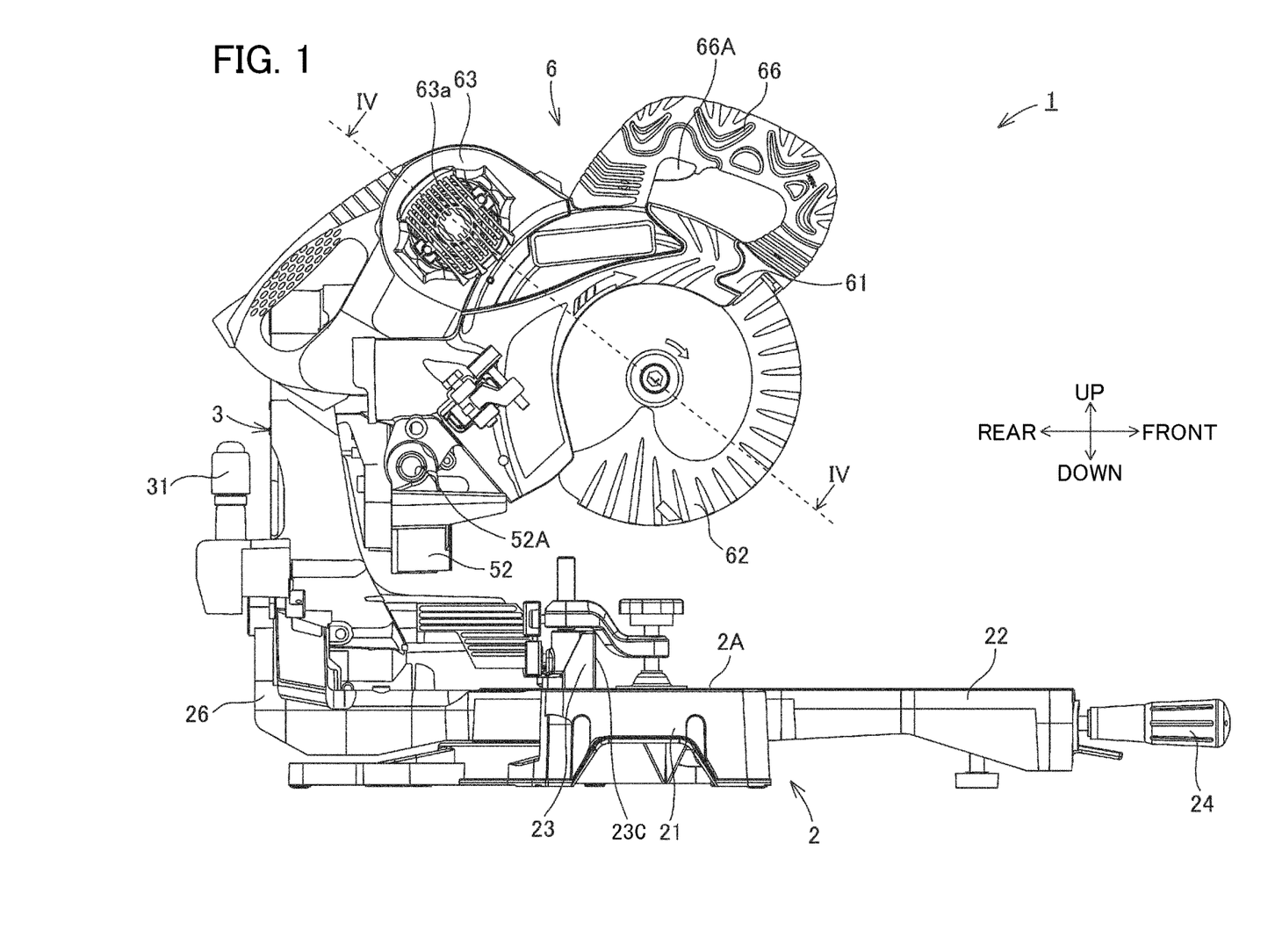
FIG. 1 is a right side view illustrating an external structure of a miter saw according to an embodiment of the present invention.

In the following description, an upward direction, a downward direction, a frontward direction, and a rearward direction are defined by "up," "down," "front," and "rear" illustrated in FIG. 1, respectively. Further, a direction toward the viewer and a direction away from the viewer in FIG. 1 are defined as a rightward direction and a leftward direction, respectively. When dimensions, numerals, and the like are referenced in this specification, the values are intended to include not only dimensions and numerals those are completely identical to these dimensions and numerals, but also dimensions and numerals that approximately correspond (values within a manufacturing tolerance, for example). Similarly, such terms as "identical," "orthogonal," "parallel," "correspond," "flush," and "constant" are intended to include the meanings "approximately identical," "approximately orthogonal," "approximately parallel," "approximately correspond," "approximately flush," and "approximately constant," respectively. Unless otherwise specified, the following description references the miter saw 1 when the cutting blade P is not tilted or pivotally moved relative to a mounting surface 2A of the base part 2 (the state illustrated in FIGS. 1 through 3).

Figure 2:
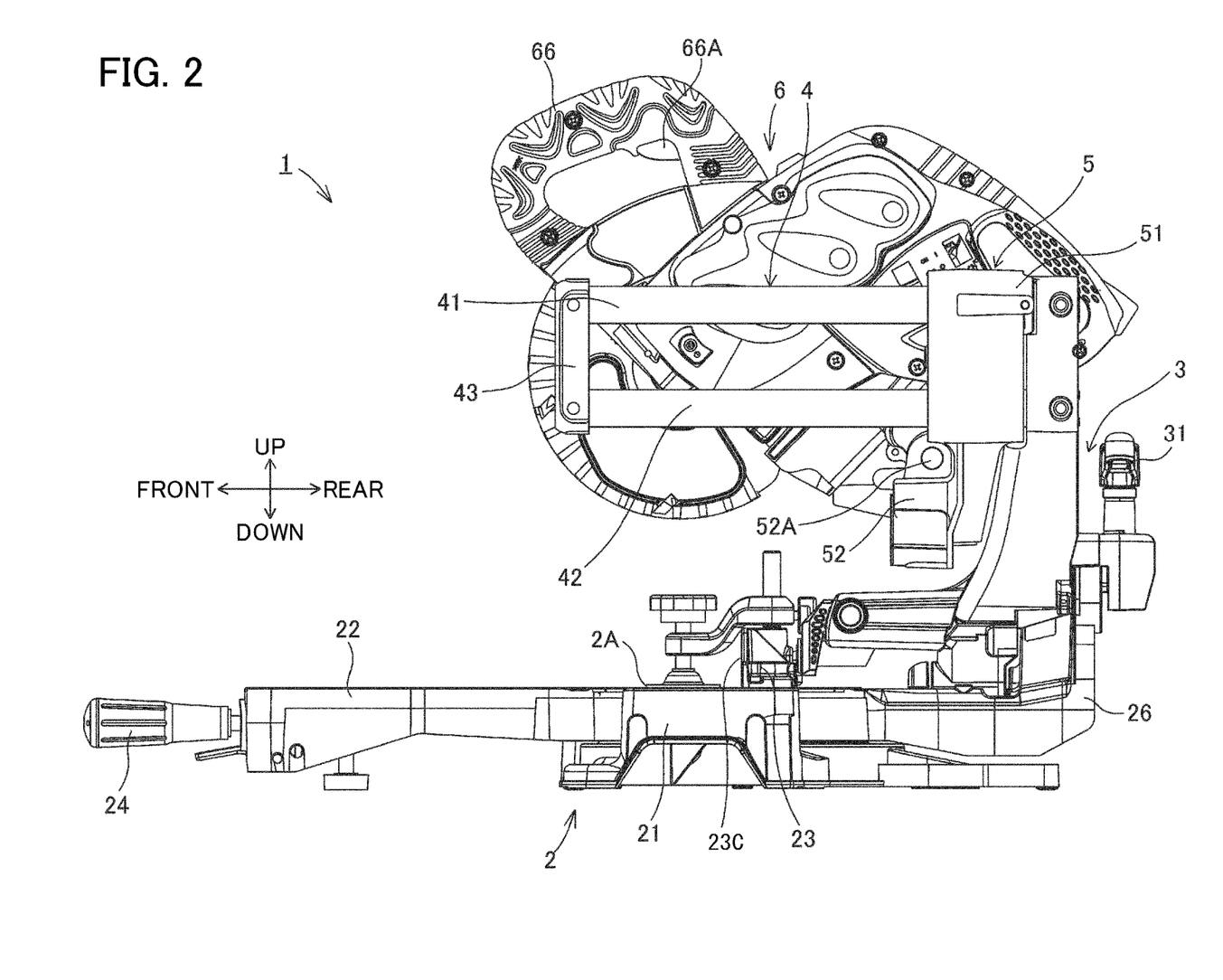
FIG. 2 is a left side view illustrating the external structure of the miter saw according to the embodiment of the present invention.
Figure 3:
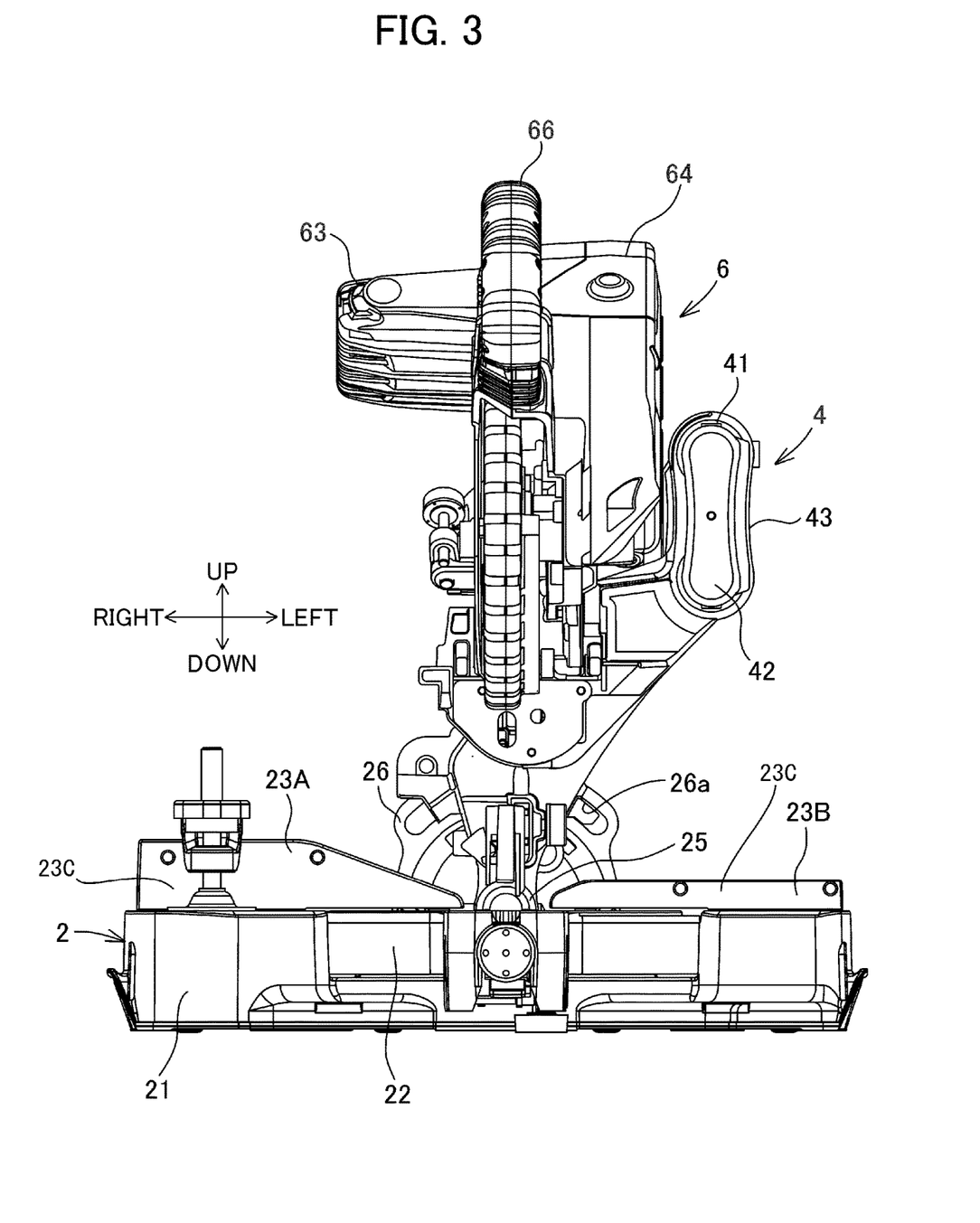
FIG. 3 is front view illustrating the external structure of the miter saw according to the embodiment of the present invention.

As illustrated in FIGS. 1 through 3, the base part 2 includes a base 21, a turntable 22, and a fence 23.

The base 21 is made of metal and is a portion that can be placed on a floor or other surface. The turntable 22 is made of metal, is connected to the base 21 via a rotational shaft (not illustrated) oriented orthogonally to a top surface of the turntable 22, and is arranged so that the top surface is approximately flush with a top surface of the base 21. The mounting surface 2A of the base part 2 on which the material being cut (the workpiece) is to be mounted is defined by the top surfaces of the base 21 and the turntable 22. A groove (not illustrated) is formed in the base 21 and the turntable 22 for allowing the cutting blade P to enter when the cutting unit 6 is moved downward during a cutting operation.

The fence 23 is disposed on the base 21. As illustrated in FIG. 3, the fence 23 includes a right fence 23A, and a left fence 23B. Each of the right fence 23A and the left fence 23B has a contact surface 23C that is substantially orthogonal to the mounting surface 2A. During the process for cutting a workpiece, one surface of the workpiece is placed against the contact surface 23C of the fence 23 to ensure a stable cutting operation.

As illustrated in FIGS. 1 through 3, an operating part 24 is provided on a front portion of the turntable 22. The operating part 24 is a part operated by a user to rotate the turntable 22 and to fix a rotated position of the turntable 22. As illustrated in FIG. 3, a tilting shaft 25 and a protruding part 26 are provided on a rear portion of the turntable 22. The tilting shaft 25 extends in the front-rear direction parallel to side surfaces of the cutting blade P and is disposed such that a center axis of the tilting shaft 25 corresponds to the top surface of the turntable 22. The protruding part 26 protrudes upward from a rear portion of the base 21. An elongate hole 26a is formed in the protruding part 26. The elongate hole 26a follows an arc centered on the center axis of the tilting shaft 25.

As illustrated in FIGS. 1 and 2, the holder 3 is provided between the base 21 and the cutting unit 6. The holder 3 is erected upward on the rear portion of the turntable 22, and has a lower portion supported so that the holder 3 is tiltable about the tilting shaft 25. With this configuration, the holder 3 can be tilted in the left-right direction relative to the turntable 22. A threaded hole (not illustrated) is formed in the holder 3 at a position corresponding to the elongate hole 26a. A clamp lever 31 is screwed into this threaded hole.

As illustrated in FIG. 2, the guide part 4 is fixed to the holder 3. The guide part 4 includes a first rod 41, a second rod 42, and a coupling member 43. The first rod 41 and the second rod 42 are configured of pipes and the like formed of a material having high rigidity. The first rod 41 extends in a direction parallel to the mounting surface 2A of the base part 2 and orthogonal to a rotational axis of the cutting blade P (the front-rear direction). The second rod 42 extends parallel to the first rod 41 at a position below the first rod 41. The first rod 41 and the second rod 42 have length identical to each other and shorter than a longitudinal direction (the front-rear direction) of the turntable 22. When the holder 3 is tilted left or right relative to the turntable 22, the first rod 41 and the second rod 42 are tilted in the left-right direction together with the holder 3.

The movable part 5 supports the cutting unit 6 so that the cutting unit 6 is pivotally movable in a direction toward the base part 2 and a direction away from the base part 2, and is supported by the guide part 4 so as to be slidably movable in the front-rear direction relative to the guide part 4. As illustrated in FIG. 2, the movable part 5 has a sliding part 51 and a cutting unit support part 52.

The sliding part 51 is disposed over the first rod 41 and the second rod 42. The first rod 41 and the second rod 42 are inserted into the sliding part 51. Through this configuration, the sliding part 51 is slidably movable over the first rod 41 and the second rod 42 between the holder 3 and the coupling member 43. The cutting unit support part 52 is supported by the sliding part 51. As illustrated in FIGS. 1 and 2, a rotational shaft 52A that extends in a direction (the left-right direction) orthogonal to the axial direction of the first rod 41 and the second rod 42 (the front-rear direction) is fixed to the cutting unit support part 52. The cutting unit support part 52 supports the cutting unit 6 so that the cutting unit 6 is pivotally movable about the rotational shaft 52A in the direction toward or away from the base part 2.

Figure 4:
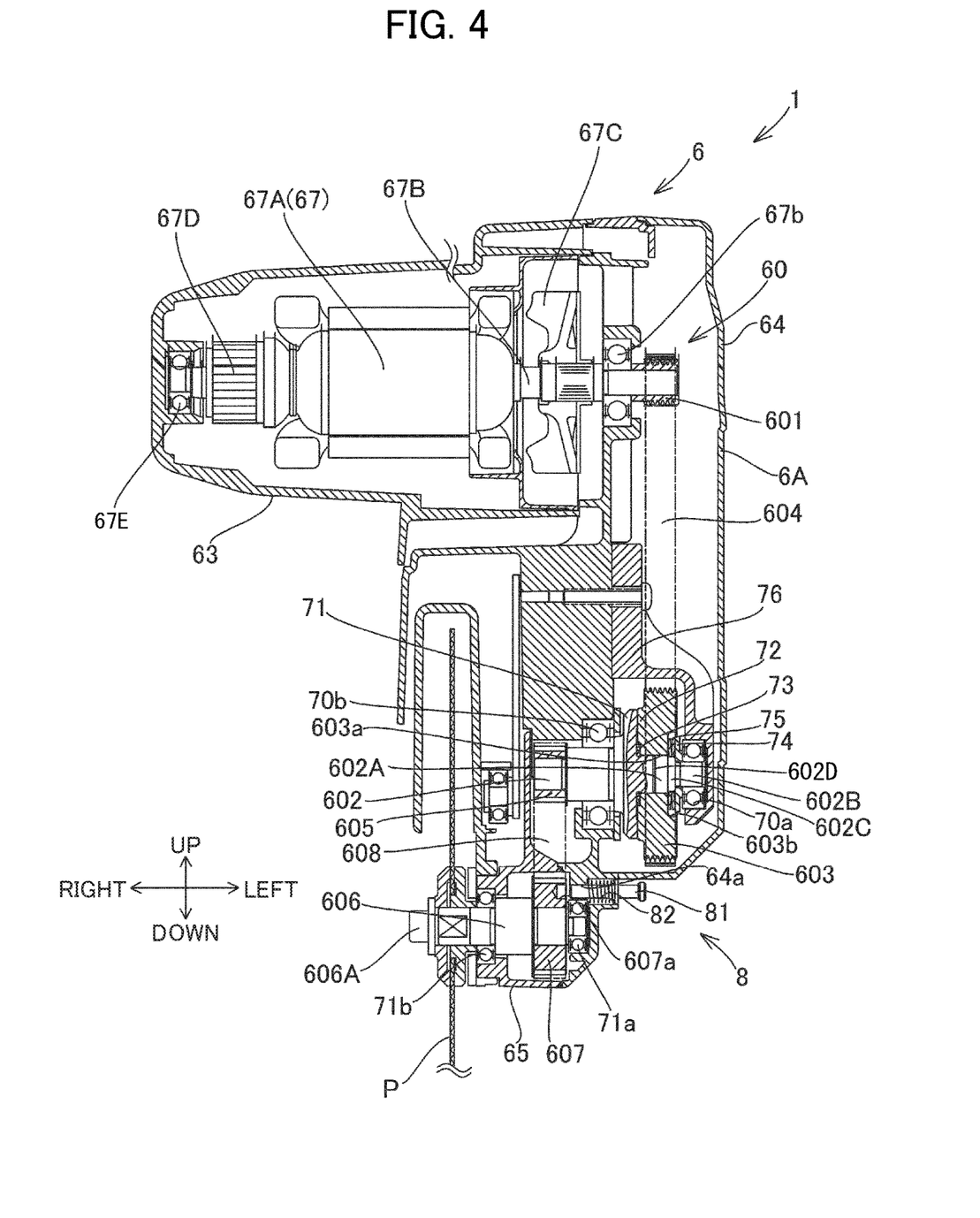
FIG. 4 is a cross-sectional view taken along a line IV-IV in FIG. 1.

As illustrated in FIG. 4, the cutting unit 6 is configured to include a motor 67 and a transmission mechanism 60, and a portion of the motor 67 and the transmission mechanism 60 is covered by a housing 6A.

As illustrated in FIGS. 1 through 4, the housing 6A of the cutting unit 6 is configured to include a saw cover 61, a safety cover 62, a motor housing 63, a gear case 64, and a gear cover 65.

As illustrated in FIG. 1, the saw cover 61 partially covers the outer circumference of the cutting blade P. The safety cover 62 can be accommodated in the saw cover 61, and is pivotally movable relative to the saw cover 61 so that a portion of the outer circumference of the cutting blade P that protrudes from the saw cover 61 can be covered by the safety cover 62.

When the cutting unit 6 is pivotally moved upward as illustrated in FIG. 1, the safety cover 62 is pivotally moved to a position for covering the portion of the outer circumference of the cutting blade P that protrudes from the saw cover 61. When the cutting unit 6 is pivotally moved downward (not illustrated), the safety cover 62 is pivotally moved to be accommodated in the saw cover 61 by a linkage mechanism (not illustrated), thereby allowing the portion of the outer circumference of the cutting blade P that protrudes from the saw cover 61 to be exposed.

The motor housing 63 has a substantially cylindrical shape that is elongated in the left-right direction. As illustrated in FIG. 1, the motor housing 63 has a right side surface formed with an intake port 63a having a slit-like shape. A handle 66 is integrally provided at the motor housing 63. The handle 66 is positioned on a line extending from the side surface of the cutting blade P. A switch 66A provided on the handle 66 controls the drive of the motor 67 accommodated in the motor housing 63.

As illustrated in FIGS. 3 and 4, the gear case 64 is coupled to an opening in the left side of the motor housing 63 and has a wall portion that extends in a direction parallel to the cutting blade P. The gear cover 65 is coupled to an opening in the right side of a lower portion of the gear case 64 and has a wall portion that extends along a direction parallel to the cutting blade P. The transmission mechanism 60 is disposed in a space defined by the inner surfaces of the gear case 64 and the gear cover 65. The gear case 64 has a lower portion formed with an insertion hole 64a that penetrates the gear case 64 in the left-right direction.

As illustrated in FIG. 4, the motor 67 is accommodated inside the motor housing 63, and includes a motor body 67A, a motor shaft 67B that is driven to rotate, a fan 67C, and a commutator 67D. The motor shaft 67B has a general columnar shape and extends in the left-right direction of the motor body 67A. The motor shaft 67B is rotatably supported by the motor housing 63 through a bearing 67E. The motor shaft 67B has a left end portion protruding to the outside (left side) of the gear case 64. The left end portion of the motor shaft 67B is rotatably supported by the gear case 64 through a bearing 67b. The motor 67 is an example of the "motor" in the present invention. The motor shaft 67B is an example of the "rotational shaft" in the present invention.

The fan 67C is fixed to the motor shaft 67B at a position leftward of the motor body 67A. The fan 67C is rotatable together with the motor shaft 67B. The fan 67C is configured to cool the motor body 67A, the commutator 67D, and the like by drawing in external air through the intake port 63a of the motor housing 63 and exhausting the air from an exhaust port (not illustrated) formed in the gear case 64.

Figure 5:
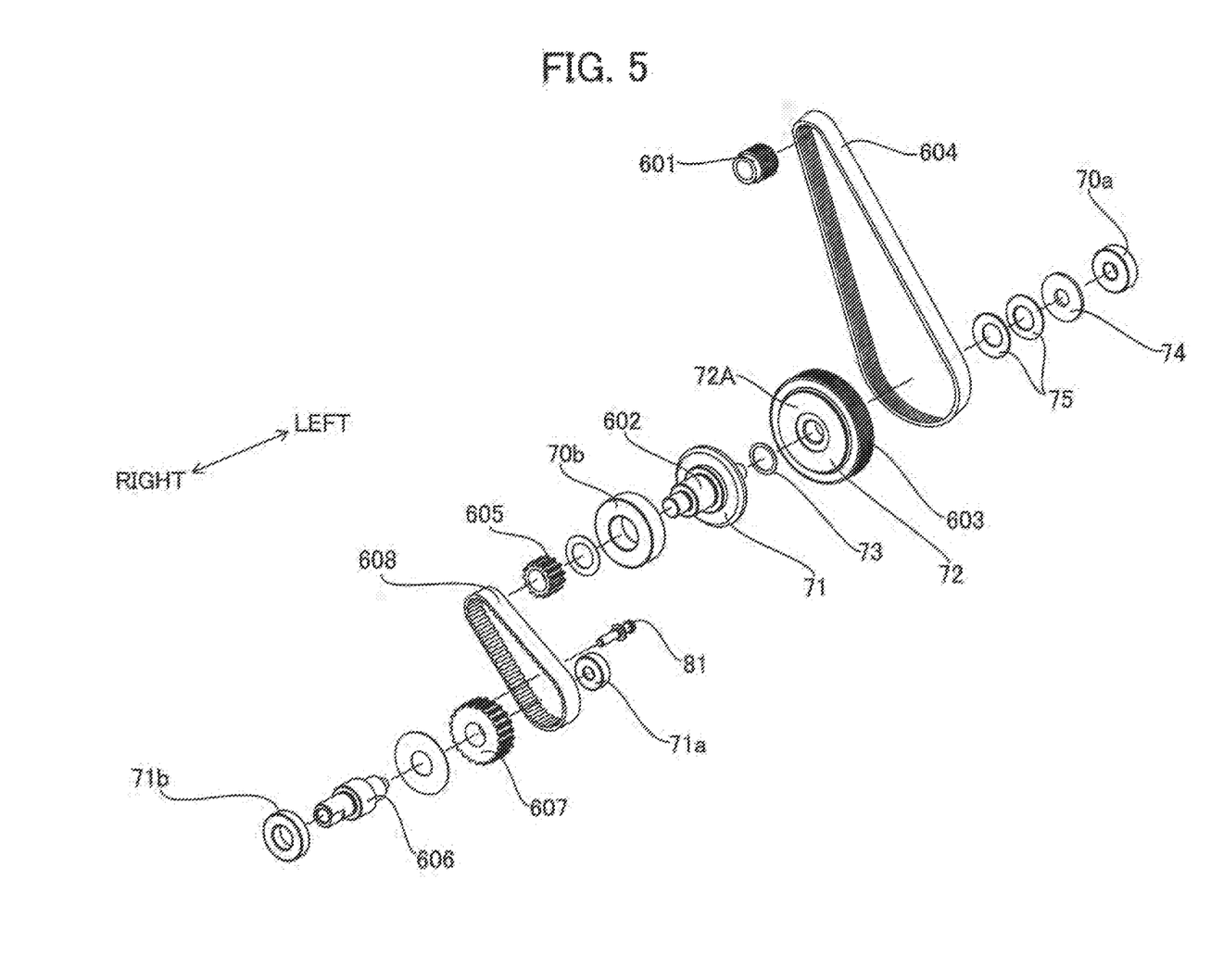
FIG. 5 is an exploded perspective view illustrating a transmission mechanism, a clutch part and a rotation restricting part in the miter saw according to the embodiment of the present invention.

The transmission mechanism 60 employs a two-stage belt system to transmit rotation of the motor 67 to the cutting blade P. As illustrated in FIGS. 4 and 5, the transmission mechanism 60 is provided with a first pulley 601, an intermediate shaft 602, a second pulley 603, a first belt 604, a third pulley 605, a spindle 606, a fourth pulley 607, and a second belt 608. Of these parts, the first pulley 601, the second pulley 603, and the first belt 604 constitute the first-stage transmission mechanism; and the third pulley 605, the fourth pulley 607, and the second belt 608 constitute the second-stage transmission mechanism. Further, the second-stage transmission mechanism (the third pulley 605, the fourth pulley 607, and the second belt 608) is accommodated in a space defined by a left side surface of the gear case 64 and the inner surface of the gear cover 65.

The first pulley 601 is a V-pulley, and has an outer circumferential surface formed with a groove extending in a circumferential direction thereof. The first pulley 601 is fixed to the left end portion of the motor shaft 67B at a position outward (leftward) of the gear case 64 and is rotatable together with the motor shaft 67B. The first pulley 601 is an example of the "first pulley" in the present invention.

The intermediate shaft 602 is positioned between the motor shaft 67B and the spindle 606 along the path that the rotational force of the motor shaft 67B is transmitted. The intermediate shaft 602 has a general columnar shape and is arranged to extend in the left-right direction parallel to the motor shaft 67B. The intermediate shaft 602 is rotatably supported by the gear case 64 through bearings 70a and 70b. In other words, the intermediate shaft 602 is rotatably supported by two bearings. The bearing 70a is supported by the gear case 64 via a bearing support part 76. The bearing support part 76 is detachably fixed to the gear case 64 by fasteners, such as bolts. By making the bearing support part 76 detachably attached to the gear case 64, any change to the portion of the transmission mechanism disposed between the bearing 70a and the bearing 70b can easily be resolved by modifying the shape of the bearing support part 76. Additionally, the intermediate shaft 602 has an insertion part 602A, a fitting part 602B, and a disc spring retaining part 602C. The intermediate shaft 602 is an example of the "intermediate shaft" in the present invention.

The insertion part 602A has a columnar shape that is elongated in the left-right direction. A lubrication groove 602D is formed in the approximate center portion of the insertion part 602A in the left-right direction. The lubrication groove 602D extends in a circumferential direction of the insertion part 602A so as to form an opening in an outer circumferential surface of the same. The lubrication groove 602D is filled with lubricating oil. The lubrication groove 602D is an example of the "groove" in the present invention. The lubricating oil is an example of the "oil" in the present invention.

The fitting part 602B constitutes a left end portion of the intermediate shaft 602 and is fitted into an inner ring of the bearing 70a.

The disc spring retaining part 602C is positioned between the insertion part 602A and the fitting part 602B in the left-right direction. The disc spring retaining part 602C has a substantially columnar shape. The disc spring retaining part 602C has an outer diameter configured to be slightly smaller than an outer diameter of the insertion part 602A.

The second pulley 603 is a V-pulley. The second pulley 603 has a substantially hollow cylindrical shape that is elongated in the left-right direction, and has an outer circumferential surface formed with grooves extending along a circumferential direction thereof. The second pulley 603 has an outer diameter greater than the outer diameter of the first pulley 601. The left end portion of the intermediate shaft 602 is inserted into the second pulley 603. The second pulley 603 has an inner circumferential surface 603a. The second pulley 603 is disposed such that the inner circumferential surface 603a faces the opening in the lubrication groove 602D formed in the insertion part 602A of the intermediate shaft 602. With this arrangement, lubricating oil filling the lubrication groove 602D spreads between the outer circumferential surface of the insertion part 602A and the inner circumferential surface 603a of the second pulley 603. Accordingly, the intermediate shaft 602 and the second pulley 603 can suitably perform relative rotation therebetween.

Figure 6:
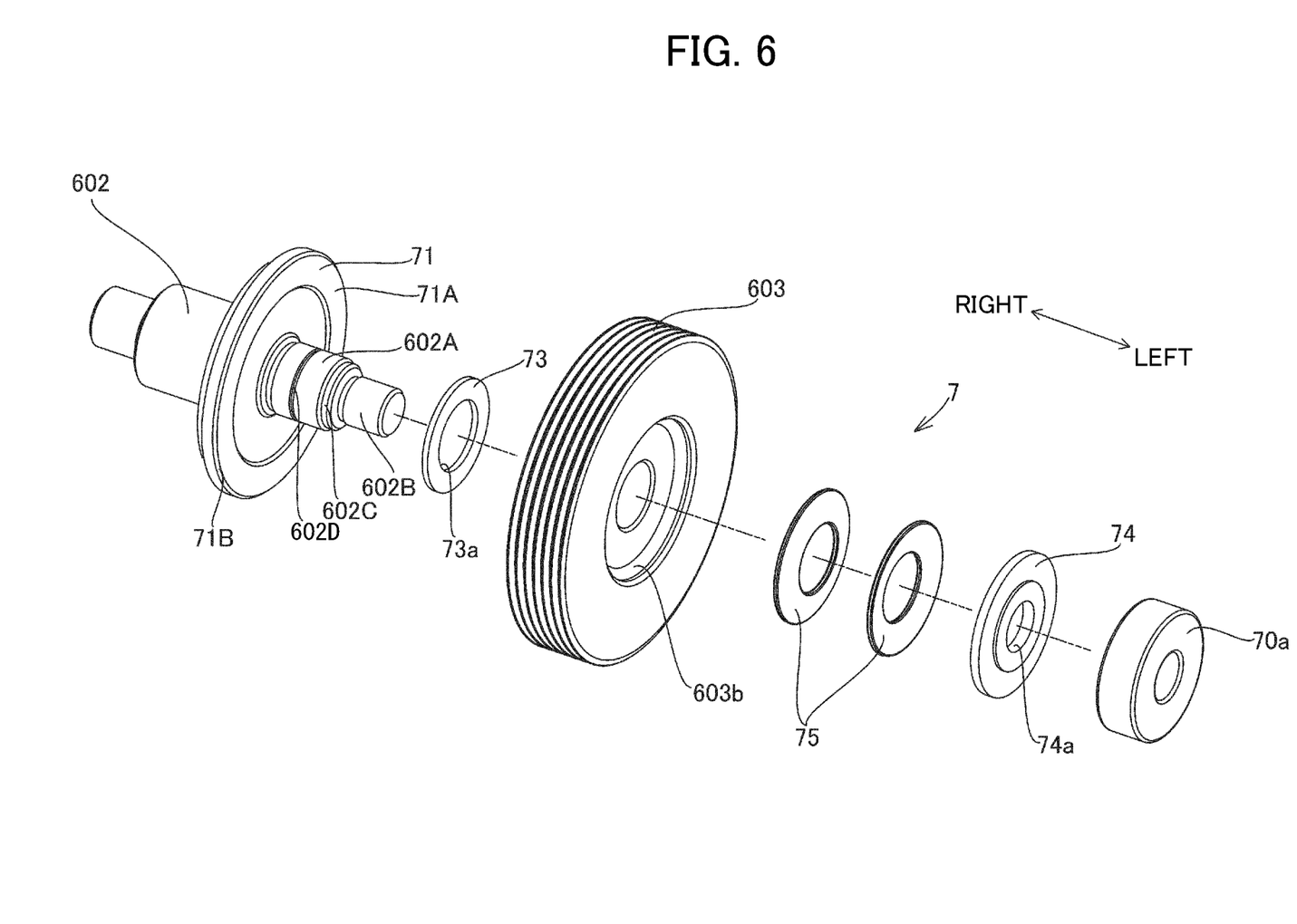
FIG. 6 is an exploded perspective view illustrating an intermediate shaft, a second pulley and the clutch part in the miter saw according to the embodiment of the present invention.

As illustrated in FIGS. 4 and 6, a recessed part 603b is also formed in the second pulley 603. The recessed part 603b has a general cylindrical shape and is depressed rightward from a left surface of the second pulley 603. The recessed part 603b is an example of the "recessed part" in the present invention.

The first belt 604 is an endless belt formed of resin. The first belt 604 is a V-belt that has an inner peripheral surface formed with grooves extending along a longitudinal direction thereof. The first belt 604 is looped over the first pulley 601 and the second pulley 603 by stretching an upper portion of the first belt 604 around the outer circumference of the first pulley 601 and a lower portion of the first belt 604 around the outer circumference of the second pulley 603. Thus, the first belt 604 is retained on a pair of pulleys (the first pulley 601 and the second pulley 603) so as to be circularly movable along a transmission path of the rotational force. The first pulley 601 and the second pulley 603 are both V-pulleys, and the first belt 604 is a V-belt. Accordingly, if an unexpected high load is generated in the cutting blade P, the V-belt slides over the outer circumference of the V-pulleys, thereby suppressing damage to components for transmitting the rotation. The first belt 604 is an example of the "first belt" in the present invention.

The third pulley 605 is a timing pulley. The third pulley 605 has a substantially hollow cylindrical shape that is elongated in the left-right direction. Teeth-like protrusions and recesses are alternatingly formed along an outer circumferential surface of the third pulley 605. By press-fitting the third pulley 605 onto the intermediate shaft 602 at a position rightward from the center of the intermediate shaft 602, the third pulley 605 is fixed to the intermediate shaft 602 and is rotatable integrally with the same. The third pulley 605 is an example of the "third pulley" in the present invention.

The spindle 606 has a substantially columnar shape and is arranged so as to extend along the left-right direction parallel to the motor shaft 67B and the intermediate shaft 602. The spindle 606 is rotatably supported by the gear case 64 via a bearing 71a and is rotatably supported by the gear cover 65 via a bearing 71b. An attachment part 606A is provided on a right end portion of the spindle 606. The attachment part 606A has bolts or other fasteners for attaching the cutting blade P to the spindle 606. The attachment part 606A protrudes to the outer side (right side) of the gear cover 65. The spindle 606 is an example of the "output shaft" in the present invention.

The fourth pulley 607 is a timing pulley and has a substantially hollow cylindrical shape that is elongated in the left-right direction. Teeth-like protrusions and recesses are alternatingly formed in an outer circumferential surface of the fourth pulley 607. The fourth pulley 607 has an outer diameter than that of the third pulley 605. By press-fitting the fourth pulley 607 onto the spindle 606 at a position leftward of the center portion of the spindle 606, the fourth pulley 607 is fixed to the spindle 606 and is rotatable integrally with the same. An insertion hole 607a is formed in the fourth pulley 607 at an eccentric position to a rotational axis of the fourth pulley 607. The insertion hole 607a forms an opening in a rear surface of the fourth pulley 607 that extends along the axial direction (left-right direction) of the spindle 606. The fourth pulley 607 is an example of the "fourth pulley" in the present invention. The insertion hole 607a is an example of the "hole" in the present invention.

The second belt 608 is an endless belt formed of resin. The second belt 608 is a timing belt having teeth-like protrusions and recesses alternatingly formed along an inner peripheral surface thereof. The second belt 608 is stretched with taut between the third pulley 605 and the fourth pulley 607 with an upper portion looped over the outer circumference of the third pulley 605 and a lower portion looped over the outer circumference of the fourth pulley 607. In this state, the protrusions and the recesses along the inner peripheral surface of the second belt 608 are in meshing engagement with the protrusions and the recesses along the outer circumferential surfaces of the third pulley 605 and the fourth pulley 607. Accordingly, the rotation of the third pulley 605 is transmitted to the fourth pulley 607 via the second belt 608, thereby rotating the fourth pulley 607. The second belt 608 is formed such that half the peripheral length thereof is greater than the distance that the second belt 608 is stretched between the third pulley 605 and the fourth pulley 607. The second belt 608 is stretched between the third pulley 605 and the fourth pulley 607 by applying tension to achieve elongation greater than one. Hence, the second belt 608 is retained on a pair of pulleys (the third pulley 605 and the fourth pulley 607) so as to be capable of circularly moving along the transmission path for the rotational force. Since the third pulley 605 and the fourth pulley 607 are both timing pulleys and the second belt 608 is a timing belt, the belt and the pulleys are in meshing engagement with each other and transmit rotational force without slippage, even when a high load is generated at the cutting blade P, thereby achieving stable cutting operations with efficiency. Use of timing belts and timing pulleys also improves the transmission efficiency of rotation and suppresses damage to the belts, thereby improving the durability of the tool.

The transmission mechanism 60 also includes a rotation restricting part 8. The rotation restricting part 8 is configured to restrict rotation of the spindle 606. As illustrated in FIGS. 4 and 5, the rotation restricting part 8 includes a pin 81, and a spring 82. The rotation restricting part 8 is an example of the "restricting part" in the present invention.

The pin 81 has a general columnar shape and extends in the axial direction (left-right direction) of the spindle 606. The pin 81 has a right end portion inserted into the insertion hole 64a formed in the gear case 64. The pin 81 is movable in the left-right direction relative to the gear case 64. The pin 81 is an example of the "restricting member" in the present invention.

The spring 82 is a coil spring. The pin 81 has a shaft portion inserted through a coil portion of the spring 82. The spring 82 has a right end in contact with a side surface of the gear case 64, and a left end in contact with a ring-shaped member provided on the pin 81. With this configuration, the spring 82 urges the pin 81 leftward relative to the gear case 64. The pin 81 can be inserted into the insertion hole 607a.

The transmission mechanism 60 further includes a clutch part 7. The clutch part 7 is an example of the "transmission restricting part" in the present invention. The structure of the clutch part 7 will be described with reference to FIGS. 4 through 6.

As illustrated in FIGS. 5 and 6, the clutch part 7 includes a plate 71, a pressed part 72, an oil-absorbing member 73, an abutment member 74, and a pair of disc springs 75.

As illustrated in FIGS. 5 and 6, the plate 71 is provided on the intermediate shaft 602. The plate 71 has a general circular shape that extends radially outward of the intermediate shaft 602 and has a thickness in the left-right direction. The plate 71 is formed integrally with the intermediate shaft 602 so that the plate 71 is rotatable together with the intermediate shaft 602 about an axis of the same. Also, as illustrated in FIG. 6, the plate 71 has a pressing surface 71A and a tapered surface 71B. The plate 71 is an example of the "pressing part" in the present invention.

The pressing surface 71A is defined on the left surface of the plate 71 and has a general annular shape in a left-side view. The pressing surface 71A is substantially orthogonal to the left-right direction. In other words, the pressing surface 71A extends in a plane orthogonal to the intermediate shaft 602. The pressing surface 71A has an inner diameter formed greater than the outer diameter of the insertion part 602A on the intermediate shaft 602. The left surface of the plate 71 positioned radially inward of the pressing surface 71A is formed to be slightly depressed rightward. However, the entire area constituting the left surface of the plate may be formed flush.

The tapered surface 71B is defined in a left end portion of the plate 71. The tapered surface 71B is defined so as to slope radially inward toward the left end portion of the plate 71. This configuration prevents an edge portion of the plate 71 from cutting into a pressed surface 72A of the pressed part 72 when the pressed part 72 rotates relative to the plate 71.

As illustrated in FIGS. 4 and 5, the pressed part 72 is provided in the second pulley 603. The pressed part 72 protrudes rightward from a right surface of the second pulley 603. The pressed part 72 is rotatable integrally with the second pulley 603. As illustrated in FIG. 5, the pressed part 72 has an annular shape in a right-side view that is coaxial with the second pulley 603, and has a diameter is formed smaller than a diameter of the second pulley 603. The pressed part 72 has the pressed surface 72A. The pressed part 72 is an example of the "pressed part" in the present invention.

The pressed surface 72A is defined on a right surface of the pressed part 72 and has a general annular shape in a right-side view. The pressed surface 72A is approximately orthogonal to the left-right direction. The pressed surface 72A opposes the pressing surface 71A of the plate 71. The pressed surface 72A has an area greater than an area of a side surface the first pulley 601.

The oil-absorbing member 73 is formed of a material with a capacity to absorb oil. In the present embodiment, the oil-absorbing member 73 is formed of felt. The oil-absorbing member 73 has a general annular shape and having a thickness in the left-right direction. A through-hole 73a is formed in the approximate radial center portion of the oil-absorbing member 73 to penetrate the oil-absorbing member 73 in the left-right direction. An inner diameter of the through-hole 73a is formed to be approximately identical to the outer diameter of the insertion part 602A provided on the intermediate shaft 602. As illustrated in FIG. 4, the insertion part 602A is inserted through the through-hole 73a. The oil-absorbing member 73 is positioned further rightward of the opening formed in the lubrication groove 602D of the insertion part 602A constituting the intermediate shaft 602. By absorbing lubricating oil that spreads rightward between the outer circumferential surface of the insertion part 602A and the inner circumferential surface 603a of the second pulley 603, the oil-absorbing member 73 suppresses oil from flowing farther rightward from a position thereof. Through this configuration, lubricating oil can be suppressed from spreading in between the pressing surface 71A and the pressed surface 72A, ensuring that a satisfactory frictional force can be generated between the pressing surface 71A and the pressed surface 72A.

As illustrated in FIG. 6, the abutment member 74 has a general annular shape with a thickness in the left-right direction. As illustrated in FIG. 4, the fitting part 602B of the intermediate shaft 602 is inserted through the abutment member 74. The abutment member 74 has a left surface that opposes the bearing 70a and a right surface that opposes the pair of disc springs 75. Further, the abutment member 74 is configured to be rotatable relative to the bearing 70a.

As illustrated in FIGS. 5 and 6, the pair of disc springs 75 have shapes substantially the same as each other each have an annular shape in left and right-side views. The pair of disc springs 75 are formed to protrude in opposing directions from each other in the axial direction of the intermediate shaft 602. When compressed in the axial direction, each of the disc springs 75 is configured to generate load proportional to the amount of compression. Each of the pair of disc springs 75 has an inner peripheral part formed with a through-hole. As illustrated in FIG. 4, the pair of disc springs 75 are arranged such that their inner circumferential parts are in contact with each other. Further, the disc spring 75 positioned on the left side contacts the right surface of the abutment member 74, while the disc spring 75 positioned on the right side contacts the left surface of the recessed part 603b of the second pulley 603. The pair of disc springs 75 is an example of the "urging member" in the present invention.

The pair of disc springs 75 is configured to have an outer diameter smaller than an inner diameter of the recessed part 603b formed in the second pulley 603. The pair of disc springs 75 are disposed inside the recessed part 603b. Generally, disc springs expand in diameter when compressed along their axial direction. Here, in the present embodiment, the inner diameter of the recessed part 603b is configured to be greater than the outer diameter of the pair of disc springs 75, thereby enabling the pair of disc springs 75 to expand suitably in diameter when compressed along their axial direction. Therefore, the disc springs 75 can suitably generate load. Further, disposing the pair of disc springs 75 in the fitting part 602B formed in the second pulley 603 avoids increasing the size of the miter saw in the left-right direction.

An inner diameter of each of the pair of disc springs 75 (an inner diameter of the through-holes formed in the inner circumferential parts of the disc springs 75) is formed to have a shape substantially the same as the outer diameter of the disc spring retaining part 602C of the intermediate shaft 602. As illustrated in FIG. 4, the pair of disc springs 75 is arranged such that their inner circumferential surfaces oppose the outer circumferential surface of the disc spring retaining part 602C. This arrangement restricts the pair of disc springs 75 from moving in radial directions of the intermediate shaft 602.

As illustrated in FIG. 4, the pair of disc springs 75 is compressed by a prescribed amount by the right surface of the abutment member 74 and the left surface of the recessed part 603b of the second pulley 603. In this state, the second pulley 603 is urged rightward due to the load generated in the pair of disc springs 75, thereby producing surface pressure between the pressed surface 72A of the pressed part 72 and the pressing surface 71A of the plate 71. Further, since the plate 71 and the second pulley 603 are positioned between the bearing 70a and bearing 70b in the axial direction of the intermediate shaft 602 in the present embodiment, good contact is formed between the pressing surface 71A and the pressed surface 72A, allowing good surface pressure to be generated between the pressing surface 71A and the pressed surface 72A. Note that the pair of disc springs 75 may instead be configured to urge the plate 71 in a direction approaching the second pulley 603.

Since the compression-to-load ratio of disc springs tends to be smaller than other springs, a large load can be applied to the urging target within a small space. However, the load variation by product (load tolerance width) tends to be relatively high. Further, since a very high load can be generated with only slight compression, the magnitude of load is difficult to adjust. However, since two disc springs are employed in the present embodiment, such variations in load can be mitigated. Further, since the pair of disc springs 75 are compressed while their inner circumferential parts are in contact with each other, the amount of load produced from the compression amount can be reduced. Note that using disc springs to generate load, as in the present embodiment, eliminates the need to provide a large space for generating load, such as when using coil springs or the like. Further, although the disc springs 75 are compressed with their inner circumferential parts in contact with each other in the present embodiment, the disc springs 75 may instead be compressed while their outer circumferential parts are in contact with each other.

Next, the operations for transmitting the rotation of the motor 67 to the cutting blade P will be described.

When the switch 66A of the handle 66 is pressed inward, the motor 67 is driven, and the motor shaft 67B begins rotating integrally with the first pulley 601. Along with this rotation, the first belt 604 looped over the first pulley 601 begins rotating through the frictional force acting between the inner peripheral surface of the first belt 604 and the first pulley 601. In other words, the first belt 604 transmits the rotation of the motor shaft 67B and the first pulley 601 to the second pulley 603, and the second pulley 603 begins rotating. On this transmission path, the first pulley 601 serves as the drive pulley and the second pulley 603 as the follow pulley.

Figure 7:
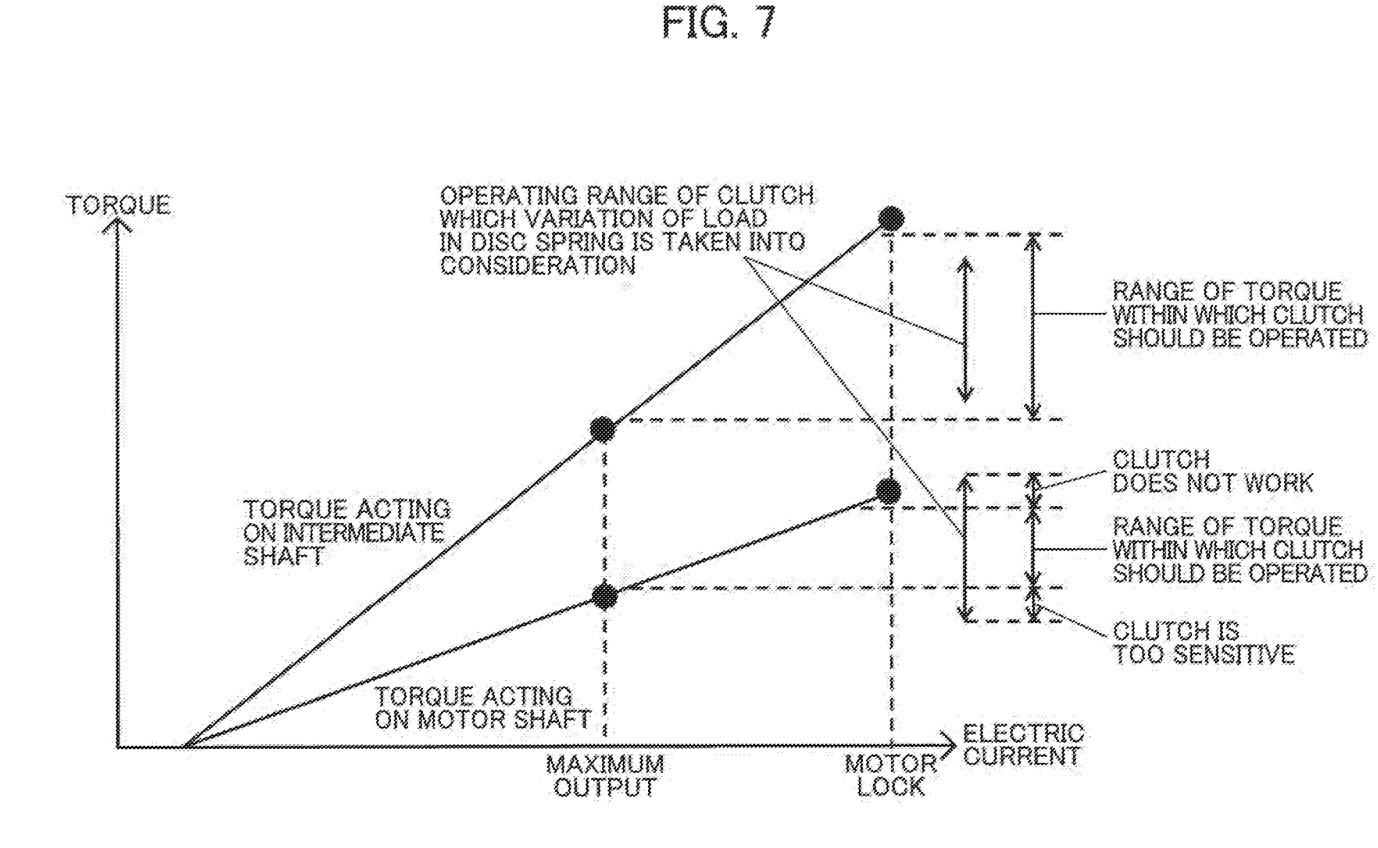
FIG. 7 is a graph illustrating a relationship between a torque acting on a motor shaft and a torque acting on the intermediate shaft, and a current flowing through a motor during an operation.

In this state, the plate 71 and the intermediate shaft 602 begin rotating, owing to frictional force produced by surface pressure between the pressed surface 72A of the pressed part 72 provided in the second pulley 603 and the pressing surface 71A of the plate 71 provided in the intermediate shaft 602. Since the second pulley 603 is configured to have the diameter greater than that of the first pulley 601, the rotation of the motor shaft 67B is decelerated when transmitted to the intermediate shaft 602. In other words, the first-stage transmission mechanism configured of the first pulley 601, the second pulley 603, and the first belt 604 reduces the rotation of the motor shaft 67B while transmitting the rotation to the intermediate shaft 602. At this time, a torque applied to the intermediate shaft 602 is greater than a torque applied to the motor shaft 67B. As illustrated in FIG. 7, a torque applied to the intermediate shaft 602 is configured to be approximately twice that acting on the motor shaft 67B in the present embodiment. Thus, rotational force can be suitably transmitted in the present embodiment through frictional force generated between the pressed surface 72A having the diameter greater than the first pulley 601 and have the area than the lateral area of the first pulley 601 and the pressing surface 71A. In particular, since the load in the disc springs required to transmit power can be decreased by increasing the area of surface contact between the pressing surface 71A and the pressed surface 72A, wear of the pressing surface 71A and the pressed surface 72A can be suppressed. Note that the area of contact can be increased more easily between the pressing surface 71A and the pressed surface 72A since the reduction ratio from the first pulley 601 to the second pulley 603 is the largest among the deceleration mechanisms in the transmission mechanism of the present embodiment. Additionally, the frictional force generated between the pressing surface 71A and the pressed surface 72A can be adjusted by modifying the shape of the pressing surface 71A or the pressed surface 72A. In the present embodiment, the pressing surface 71A is formed in a general annular shape in a right-side view, but the entire left surface of the plate may be formed in a single plane. The more the contact surface is increased, the greater the frictional force becomes.

In this state, the third pulley 605 fixed to the intermediate shaft 602 rotates. In accordance with this rotation, the second belt 608 in meshing engagement with the third pulley 605 is circularly moved by the third pulley 605, and the fourth pulley 607 in meshing engagement with the second belt 608 is rotated by the second belt 608. Since the fourth pulley 607 is configured with a greater diameter than the third pulley 605, the rotation of the intermediate shaft 602 is reduced before transmitted to the spindle 606. In other words, the second-stage transmission mechanism configured of the third pulley 605, the fourth pulley 607, and the second belt 608 reduces the rotation of the intermediate shaft 602 and transmits this rotation to the spindle 606. In this transmission, the third pulley 605 serves as the drive pulley and the fourth pulley 607 as the follow pulley.

As the spindle 606 rotates, the cutting blade P attached to the attachment part 606A of the spindle 606 rotates along with and at a rotational speed the same as the spindle 606. As described above, the rotation of the motor shaft 67B is transmitted to the cutting blade P after being reduced in two stages through the two-stage transmission mechanism.

Next, operations for replacing the cutting blade P using the rotation restricting part 8 will be described with reference to FIG. 4.

First, an operator presses the left end portion of the pin 81 rightward against the urging force of the spring 82. When pressed, the pin 81 is moved rightward.

While maintaining this state where the pin 81 is pressed, the operator rotates the cutting blade P, seeking a position of the cutting blade P at which the insertion hole 607a overlaps the pin 81 in the left-right direction. When the insertion hole 607a overlaps the pin 81, the pin 81 is inserted into the insertion hole 607a.

Since the insertion hole 607a is at an eccentric position to the rotational axis of the fourth pulley 607, rotation of the fourth pulley 607 is restricted at this time. At the same time, rotation of the spindle 606 and the cutting blade P are also restricted.

In this state, the operator either tightens or removes the bolts in the attachment part 606A to attach or detach the cutting blade P to or from the attachment part 606A. After completing the replacement operation, the operator releases the pin 81. The pin 81 is moved leftward by the urging force of the spring 82 to separate from the fourth pulley 607, and is returned to the state illustrated in FIG. 4. In this way, rotation of the spindle 606 can be restricted in the present embodiment by inserting the right end portion of the pin 81 into the insertion hole 607a. With this configuration, the cutting blade P can be successfully attached or detached while the spindle 606 remains fixed.

Next, cutting operations using the miter saw 1 will be described.

First, when cutting a workpiece at a right angle to the mounting surface 2A of the base 21, the switch 66A is pressed inward, driving the motor 67 to rotate the cutting blade P. In this state, the operator moves the cutting unit 6 downward to begin cutting the workpiece. Specifically, the operator moves the cutting unit 6 downward by rotating (pivoting) the cutting unit 6 about the rotational shaft 52A of the cutting unit support part 52.

On the other hand, when cutting a workpiece at an angle that is not perpendicular to the mounting surface 2A of the base 21, the operator operates the clamp lever 31 of the holder 3 to release fixing of the holder 3 relative to the base part 2. In this state, the operator moves the handle 66 leftward or rightward. As the handle 66 is moved leftward or rightward, the holder 3 and the cutting unit 6 tilt about the center axis of the tilting shaft 25 provided in the base part 2. The operator uses the clamp lever 31 to fix the holder 3 at a desired inclination angle to the base part 2 and performs a cutting operation by pivotally moving the cutting unit 6.

In general, electric current flowing into the motor increases during operations as the load torque increases. As illustrated in FIG. 7, electric current flowing into the motor has a proportional relationship with torque acting on the motor shaft and the intermediate shaft. Here, the "maximum output" indicated in FIG. 7 denotes the current value at which work efficiency is optimal, i.e., the current value that produces the best relationship between rotational speed and torque. Further, "motor lock" illustrated in FIG. 7 denotes the value of electric current flowing into the motor when the spindle locks up and can no longer rotate as the cutting blade cuts into the workpiece.

As described above, work efficiency worsens at the point the electric current flowing through the motor exceeds the maximum output. That is, the need to continue transmitting the rotational force of the motor to the belts decreases when the value of current flowing through the motor exceeds the maximum output. In the meantime, if the motor continues to rotate after the spindle locks up caused by the cutting blade cutting into the workpiece, the belts could be damaged by the rotational force of the motor. Therefore, a clutch part must be provided to interrupt transmitting the turning force of the motor to the belt or to limit the transmitted force once the current in the motor exceeds the value corresponding to the maximum output and before the motor locks up.

As illustrated in FIG. 7, it is conceivable that structures similar to the clutch part in the present embodiment be provided on the motor shaft rather than the intermediate shaft in order to interrupt or limit the transmission of force from the motor to the first belt.

However, since the frictional force generated in the clutch part is proportional to the load of the disc springs, the tolerance for load among disc spring products is large and the rate of change in torque acting on the motor shaft to electric current is small. Consequently, interrupting or restricting the transmission of the rotational force of the motor to the belts when the electric current flowing into the motor exceeds the maximum output and before the motor locks up has been difficult. Specifically, if the load in the disc springs is small, the frictional force generated in the clutch part is reduced. This relationship allows the rotational force to be interrupted or limited before the motor current reaches the maximum output, resulting in worse work efficiency (a clutch is too sensitive). On the other hand, if the load in the disc springs is large, the frictional force generated in the clutch part is increased. Thus, the rotational force is not interrupted even if the motor locks up (the clutch does not work), potentially resulting in damage to the belts. In other words, it has been difficult to limit the transmission of the rotational force at a desired torque by providing a clutch part on the motor shaft since the operating range of the clutch used for interrupting or limiting the transmission of the rotational force from the motor is not contained within the range of torque for which the clutch should be operated.

However, in the present embodiment, the clutch part 7 is provided for torque applied to the intermediate shaft 602, which has a greater rate of change to current than the torque applied to the motor shaft 67B. In other words, the clutch part 7 is provided to interrupt or limit torque acting on rotational bodies from the second pulley 603 to the spindle 606 that reduce and transmit the rotation of the motor shaft 67B, i.e., torque acting in the transmission path for transmitting the rotation of the second pulley 603 to the cutting blade P. With this configuration, the clutch operating range for interrupting or limiting rotational force from the motor 67 falls within the desired range of torque for operating the clutch, as illustrated in FIG. 7. This configuration can adequately suppress the clutch part 7 (transmission mechanism) from excessively or insufficiently interrupting or limiting the transmission of rotation. In the present embodiment, the load acting on the intermediate shaft 602 exceeds the frictional force (static frictional force) between the pressing surface 71A of the plate 71 and the pressed surface 72A of the pressed part 72 after the current flowing through the motor exceeds the current value at maximum output and before the motor locks up, enabling the pressing surface 71A and the pressed surface 72A to be slidingly moved over each other and the intermediate shaft 602 and the second pulley 603 to rotate relative to each other. In other words, the transmission of rotational force from the motor shaft 67B of the motor 67 to the spindle 606 is interrupted or restricted by interrupting or limiting the transmission of the rotation of the second pulley 603 to the intermediate shaft 602. Since transmission of the rotational force of the motor shaft 67B can be interrupted or limited prior to the spindle 606 locking up as the cutting blade P cuts into the workpiece, this configuration can suppress excessive load on the transmission mechanism and can reduce damage to components constituting the transmission mechanism, such as the belts and the pulleys. Further, since the clutch part 7 in the present embodiment is provided on the second pulley 603 which is a follow pulley, transmission performance can be ensured by securing more surface area (the pressed part 72) for friction-driven transmission than when the clutch part 7 is provided on the drive-side pulley. Further, since the reduction ratio from the first pulley 601 to the second pulley 603 is greater than the reduction ratio from the third pulley 605 to the fourth pulley 607, the diameter of the fourth pulley 607 is smaller and ensures good cutting performance. At the same time, since the clutch part 7 is provided on the second pulley 603, which has the largest diameter, more surface area can be allocated for the friction-driven transmission surface (the pressed part 72).

Further, for the bearings 70a and 70b that support the intermediate shaft 602, the bearing 70b has a diameter greater than the bearing 70a in the present embodiment. Since the intermediate shaft 602 receives tensile loads from two belts (the first belt 604 and the second belt 608), by increasing the size and rigidity of the bearing 70b located between the two positions that receive tension, skewing of the intermediate shaft 602 can be restrained. Further, by making the bearing 70a relatively small, increase in size of the housing 6A can be suppressed. Further, the disc springs 75 in the present invention urge the second pulley 603 toward the bearing 70b, i.e., rightward. Thus, the urging force of the disc springs 75 is transmitted to the bearing 70b via the second pulley 603 and the plate 71 and is finally transmitted to the gear case 64. Hence, while the second pulley 603 and the plate 71 are interposed between the bearing 70b and the disc springs 75, a load for generating sufficient friction between the pressing surface 71A and the pressed surface 72A is applied to the bearing 70b at this time. However, as the bearing 70b is made with high durability as described above, the bearing 70b can withstand the load from the disc springs 75. In other words, when a friction-based clutch mechanism is disposed between two bearings, the life of the mechanism can be improved and the size of the product made more compact by directing the urging direction of the springs toward the bearing having the larger diameter.

A miter saw is described in the present embodiment as an example of the power tool. However, the present invention may be applied to other motor-driven power tools, such as a circular saw or a planer.

REFERENCE SIGNS LIST

1: miter saw, 2: base part, 3: holder, 4: guide part, 5: movable part, 6: cutting unit, 7: clutch part, 8: rotation restricting part

The invention claimed is:
1. A power tool comprising:
a motor comprising a rotation shaft that is driven to rotate;
an intermediate shaft extending in an axial direction;
an output shaft to which a cutting blade is attachable;
a first pulley provided on the rotation shaft and rotatable integrally with the rotation shaft;
a second pulley having an inner circumferential surface through which the intermediate shaft is inserted;
a third pulley provided on the intermediate shaft and rotatable integrally with the intermediate shaft;
a fourth pulley provided on the output shaft and rotatable integrally with the output shaft;

a first belt configured to transmit a rotational force of the first pulley to the second pulley;

a second belt configured to transmit a rotational force of the third pulley to the fourth pulley;

a plate extending from the intermediate shaft in a radial direction perpendicular to the axial direction of the intermediate shaft;

a pressing part provided at the plate and facing the second pulley;

a pressed part provided at the second pulley and facing the plate;

an urging member configured to urge the second pulley toward the pressing part; and an oil-absorbing member, wherein the intermediate shaft has an outer circumferential surface formed with a groove filled with lubricating oil, the groove being covered with the inner circumferential surface of the second pulley, wherein the pressing part is positioned away from the outer circumferential surface of the intermediate shaft in the radial direction, wherein the oil-absorbing member is provided closer to the plate than the groove is to the plate, wherein the oil-absorbing member is disposed between the intermediate shaft and the pressing part in the radial direction, and wherein the intermediate shaft is configured to rotate by a rotational force from the second pulley transmitted owing to frictional force between the pressed part and the pressing part.

2. The power tool according to claim 1, wherein the pressing part is configured to rotate relative to the pressed part when a load applied to the intermediate shaft exceeds a prescribed load.

3. The power tool according to claim 1, wherein the intermediate shaft is supported by two bearings, and wherein the pressing part and the second pulley are disposed between the two bearings in the axial direction of the intermediate shaft.

4. The power tool according to claim 1, further comprising a restricting part capable of restricting rotation of the output shaft, wherein the fourth pulley is formed with a hole extending in an axial direction of the output shaft, wherein the restricting part comprises a restricting member extending in the axial direction of the output shaft, and wherein the restricting part is capable of restricting the rotation of the output shaft when the restricting member is inserted into the hole.

5. The power tool according to claim 1, wherein the first belt is a V-belt, and wherein the first pulley and the second pulley are V-pulleys.

6. The power tool according to claim 1, wherein the urging member is a disc spring, and wherein the disc spring is supported by an abutment member provided at the intermediate shaft.

7. The power tool according to claim 6, wherein the disc spring comprises a plurality of disc springs.

8. The power tool according to claim 1, wherein the urging member is accommodated in a recessed part provided in the second pulley at a position opposite the plate.

* * * * *